Figure 1:
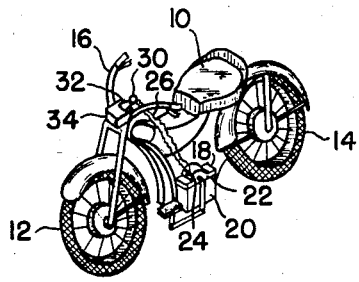

Feb. 3, 1959             C. J. IRELAND             2,872,660

TRANSMISSION INDICATOR

Filed Sept. 11, 1956

INVENTOR.
Calvin J. Ireland

BY Webb, Mackey & Burden

HIS ATTORNEYS

United States Patent Office 2,872,660
Patented Feb. 3, 1959

2,872,660

TRANSMISSION INDICATOR

Calvin J. Ireland, Turtle Creek, Pa.

Application September 11, 1956, Serial No. 609,121

2 Claims. (Cl. 340—52)

The present invention relates to a transmission indicator for vehicles, particularly foot shifted motorcycles.

With the advent of the hand clutched motorcycle transmission which eliminates the clutch pedal so as to free the feet of the driver to touch ground at both sides of the machine for safety in maneuvering, the necessary consequence has been to likewise eliminate the conventional hand shift and quadrant device from such machines and employ a foot shift for changing drive settings to the different speed ratios. The driver of a machine arranged in this manner, not only newly senses a remote or detached feeling with respect to the actual speed ratio setting existing in the transmission thereof, but he also experiences the real difficulty of utterly lacking assurance that the transmission is not temporarily caught between two drive settings so as to behave with the false appearance of being in neutral and actually producing a dangerous situation in which vibrations from cranking or starting the engine might jostle the transmission into gear unexpectedly to the driver.

This invention eliminates or materially reduces the foregoing difficulty by providing, in a foot shifted motorcycle having a handle bar steering arrangement, a switch operated signal lamp on the handle bars and a switching mechanism associated with the shifting mechanism on the transmission for operating that lamp to signal when the transmission is accurately set in the neutral position only. Thus, the driver has a positive means of knowing when he is safe to crank the engine without danger of engine vibrations jostling the transmission into a drive setting catching him unawares. The engine starts to run after being cranked and when it is properly idling, the driver temporarily employs one foot on the shift pedal in the usual manner to select the desired starting ratio and then he is free to set both feet firmly on the ground to maneuver and steady the machine as he advances the engine speed slightly and then releases the hand clutch lever on the handle bar to set the machine in motion under power.

While it is contemplated broadly that the present transmission indicating apparatus may be employed in a vehicle as original equipment, certain particular features of the invention have to do with one arrangement which is especially designed for use as an accessory to be applied to the foot shifted models of the vehicle after they have left the factory. This accessory arrangement includes a lamp housing which is removably attached to the handle bars of the vehicle within sight of the operator and which has a red lens and contains a lamp bulb behind the lens to illuminate the same at the proper time for indicating neutral position of the transmission. More specifically, the lamp bulb is controlled at the proper time through switching mechanism operable due to the wiping action of a protrusion carried by a moving part of the shift selector mechanism.

Figure 4:
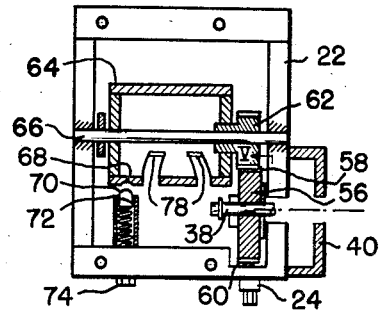
Figure 2:
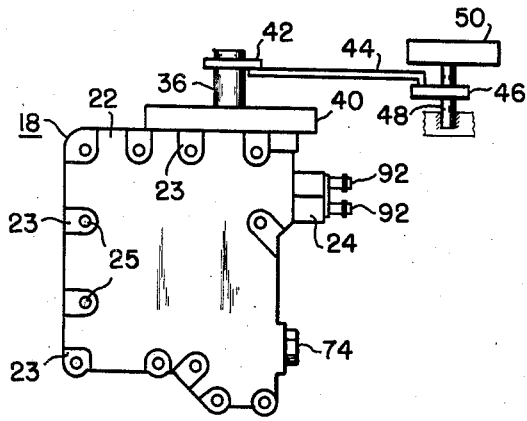
Figure 5:
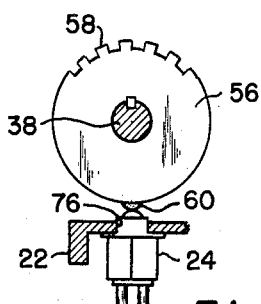
Figure 3:
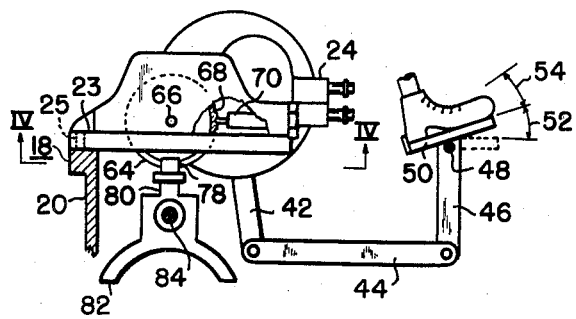
Figure 6:
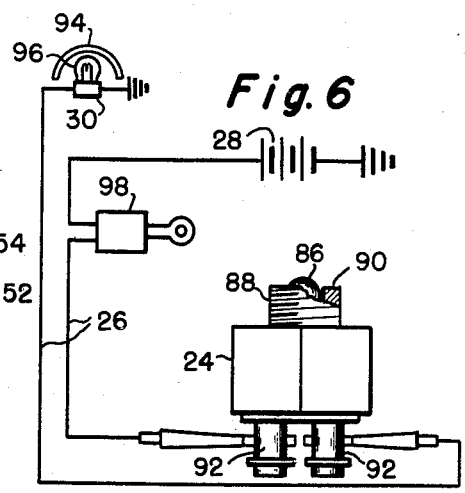

Further features, objects and advantages will either be specifically pointed out or become apparent when for a better understanding of the invention, reference is made to the following description taken in conjunction with the accompanying drawings which show a preferred embodiment, and in which;

Figure 1 is a schematic perspective view of the invention embodied in a motorcycle having a foot shifted transmission;

Figures 2, 3, and 4 are top plan, side elevation, and bottom plan views of the cover of the transmission, with Figure 4 being in section taken along the lines IV—IV of Figure 3;

Figure 5 is a fragmentary transverse section taken along the lines V—V of Figure 4; and Figure 6 is a schematic wiring diagram of the transmission indicator circuit.

In the drawings a schematically appearing two-wheeled motorcycle is represented by only certain of its major components consisting of a saddle 10, a pair of front and rear wheels 12 and 14, a handle bar assembly 16 connected to steer the front wheel 12 through the usual wheel fork, not shown, and a change speed transmission box 18 connected to drive the rear wheel 14 through the usual drive chain and sprocket connections, not shown. The box 18 has a receptacle shaped body portion 20 and a detachable cover 22 cooperating therewith to form a case for the transmission. Rows of flat spots 23 are machined in the face of the attaching flange of the case cover 22 and the cover is drilled at these spots to provide holes 25 for receiving hold-down bolts which thread into the body portion 20. A transmission switch 24 mounted to the front of the cover 22 has a two-wire lead 26 thereto by which it conducts current from the usual negative-grounded vehicle battery 28 to an indicator lamp 30 which is grounded to a triangular mounting plate 32 in a position bridging between the bars of the handle bar assembly 16. An upper clamping plate 34 connecting the two bars directly supports the triangular mounting plate 32 so as to ground it to the frame of the machine. A gear ratio selector shaft carried by the cover 22 of the transmission case consists of coaxial relatively rotatable outer and inner portions 36, 38 which are disengageably connected together through the internal mechanism of a conventional ratchet box 40. The outer shaft portion 36 carries a depending crank 42 which is connected through a drag link 44 to another crank 46 which at its upper end is fast to a cross shaft 48 so as to swing about a fixed axis. The cross shaft 48 has its inner end mounted in an appropriate fixed bearing carried by the motorcycle structure and at the outer end it rigidly carries a pedal member or equivalent foot control 50. Appropriate centering springs, not shown, are operatively connected to keep the member 50 normally in the solid line, neutral position shown.

As best shown in Figure 3, an appropriate amount of toe pedal applied by the driver causes the pedal member 50 to rock from neutral position and reciprocate in one short, vertically disposed arc 52 therebelow and an appropriate succession of heel pedal motions causes the member 50 to rock upwardly from its neutral position and reciprocate in a short adjacent upper arc 54. In known manner the mechanism in the ratchet box 40 respectively communicates the heel pedal operations to the inner shaft portion 38 to selectively upshift the transmission in stages and an appropriate number of toe pedal operations brings the transmission successively through the range of down shifting. Five transmission settings are contemplated and therefore four successive toe taps on the pedal are necessary to down shift the transmission through the complete range and vice versa.

The inner shaft portion 38 has a gear-shifter gear 56 fast thereto which consists of a gear blank hobbed part way around to provide a partial set of gear teeth 58 and on the unhobbed part there is provided a protrusion 60 which may consist of a raised bead of weld metal or other bump.

In one physically constructed embodiment of the invention this bump was weld bead 1/32 of an inch thick. The partial set of gear teeth 58 continually mesh with a cam pinion 62 which is fast to a revolvable gear shifter cam 64 of generally cylindrical shape. The cam and pinion 64, 62 freely rotate on the center section of a fixed shaft 66 set at its opposite ends in openings in the cover 22. The gear shifter cam 64 has a circumferential row of spaced dents 68 on a portion of the arcuate surface thereof, each of which may extend the full longitudinal length of the cylinder so as to impart a corrugated effect to that portion of the cam. A spring pressed plunger 70 rides into and sockets itself in these respective dents 68, being mounted to slide in a fixed bore 72 which extends outwardly through the side of the case cover 22 and which is closed at its outer end by means of a screw plug 74. The dents 68 conform to the shift pattern of the transmission in the preferred order l–N–2–3–4 and the detent 70 normally sockets itself firmly in these dents as they index with it so as to positively hold the transmission in its settings, but it can also ride to in-between positions between dents wherein the transmission behaves as if it is in neutral whereas actually it may be temporarily caught between the respective 2 and 3 speeds referred to and between the respective 3 and 4 speeds forward, etc. The protrusion 60 on the gear-shifter gear 56 is so located that it approximately lines up with the detent 70 at the front of the transmission case cover when the transmission is in neutral, the neutral condition being characterized by the fact that the detent 70 sockets itself in a corresponding N dent along the row of dents 68 on the cam 64.

The transmission switch 24 has a mounting portion which threads into an opening 76 located in the front of the case cover 22 at a point where the switch is substantially transversely aligned with the plunger 70 at the front of the transmission. The transmission switch 24 has a push button with which the protrusion 60 indexes and wipes against to operate the switch, but only at those times in which the transmission and the gear shifter cam 64 are firmly held in their corresponding N or neutral positions. Thus, the detent and switch elements 70 and 24, cooperate with an indexing function with reference to the gear shifter mechanism so as to sense the fact and hold it there when it has shifted the transmission into neutral.

In known manner the revolvable gear-shifter cam 64 is formed with two spaced sinuous cam slots 78 in one wall thereof which receive a like number of cylindrical cam followers 80. The cam followers 80 are of a type which may be arranged to control a planetary transmission through provision of appropriate pressure fluid clutches and brakes and shift selector valving therefor, but which as herein disclosed, operate independent shift forks 82 which slide on a fixed rail 84 extending crosswise in the body portion 20 of the transmission case. In the usual way, these shift forks 82 operate suitable jaw clutches for selectively controlling continually meshed, main, and countershaft gear clusters, not shown, in the body portion 20 to produce the desired shift pattern l–N–2–3–4 already indicated. To set the transmission in neutral from its l or low gear setting, the driver merely taps the pedal member 50 once with his heel and to upshift further into the 2–3 or 4th speed positions forward, he applies his heel with an appropriate additional number of taps. Contrariwise, successive applications of toe pedal will down-shift the transmission to or through neutral to the low gear setting l.

In Figure 6, the push button transmissions switch 24 has a ball point in which the actuating button is actually formed of a ball bearing element 86 mounted both to rotate and to retract within the bore of a threaded mounting portion 88 thereof, this bore having a complementary frusto spherical bearing surface 90 inside its outer end. This novel rotative action of the ball bearing element 86 is such that it rolls under each wiping contact caused by the protrusion 60 on the gear-shifter gear 56 so as to eliminate concentrated wear at one point by exposing a different surface to the protrusion for each operation. Therefore no flat spot results. The ball bearing element 86 is spring urged axially of the bore and when depressed therein it closes internal contacts in the switch 24 to electrically interconnect its external binding posts 92. These internal contacts, not shown, are of the usual fixed and movable type in which the movable contact is closed by the ball bearing element 86 to establish a circuit through the switch 24. The binding posts 92 therefore form a current conducting means between the two-wire lead 26 so as to electrically interconnect the battery 28 and the indicator lamp 30 mounted to the handle bar assembly 16.

The indicator lamp 30 includes an open housing, not shown, a red lens 94 closing the opening in the housing, and an electric lamp bulb 96 therein to illuminate the lens so as to indicate neutral setting of the transmission. To prevent the lamp bulb 96 from being energized when the vehicle is not being operated, a key controlled ignition switch 98 is inserted in one of the wires of the two-wire lead 26 intermediate the battery 28 and the transmission switch 24. Thus, when the motorcycle engine is shut off, the indicator lamp 30 will not function.

As herein disclosed, the invention is shown embodied in a grounded two-wire system in which the transmission switch 24 completes the circuit between the two wires to energize the red indicator lamp 30. It is evident that the invention has equally advantageous application to a single wire system including the lamp 30 and a battery in circuit therewith at one side and having the current conducting switch means on the transmission replaced by a single, bare electrical contact in circuit with the lamp at the opposite side. The top of the weld or other wiping protrusion on the gear shifter gear against the bare contact will, of course, ground the lamp circuit at that point so as to complete a path for energizing current from the battery to the lamp 30. So also the drawings show the protrusion 60 located on the gear member, but self-evidently the protrusion is equally well carried at an appropriate point directly on the cam 64 or on another moving member of the shifter mechanism and the current conducting means can be readily relocated in operative association therewith so as to complete the circuit only when the cam has set the transmission in neutral setting.

Variations within the spirit and scope of the invention described are equally comprehended by the foregoing description.

I claim:

1. An indicator system for a motorcycle transmission including cover structure having gear-shifter gear and cam members meshing together therein to select the setting of the transmission, detent and current conducting elements transversely aligned with one another in said cover structure and extending therefrom into operative positions to index with points on said cam and gear members respectively, said gear being hobbed only part way generating only a partial set of teeth, there being at least one indented point on said cam member to receive the detent corresponding to neutral position, there being a corresponding point on said gear member which is raised on the unhobbed portion and arranged to wipe against and cause said current conducting means to make electrical contact when the transmisison is neutral, and a source of current and an indicator lamp in circuit with said current conducting element for lighting when the element makes electrical contact to visually indicate the neutral position of the transmission.

2. A system according to claim 1 above wherein said current conducting element comprises a ball pointed switch having fixed and movable internal contacts which make mutual contact to complete the circuit, and further having the protruding ball point which actuates the switch arranged to roll under the pressure of each wiping contact caused by said raised point on the gear member so as to eliminate concentrated wear at one point by exposing a different surface each time.

References Cited in the file of this patent

UNITED STATES PATENTS

| | | |
|---|---|---|
| 1,675,203 | White | June 26, 1928 |
| 1,846,513 | Douglas | Feb. 23, 1932 |
| 1,979,836 | Kryzer | Nov. 6, 1934 |
| 2,005,483 | Sucky | June 18, 1935 |
| 2,060,705 | Velo | Nov. 10, 1936 |

FOREIGN PATENTS

| | | |
|---|---|---|
| 709,600 | Germany | Aug. 21, 1941 |
| 409,558 | Great Britain | May 3, 1934 |